(12) United States Patent
Strand

(10) Patent No.: US 6,208,263 B1
(45) Date of Patent: Mar. 27, 2001

(54) MULTIPLE VALUE MULTIPLE OWNER MESSAGE CLASS

(75) Inventor: Rolf L. Strand, Crystal, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/123,306

(22) Filed: Jul. 28, 1998

(51) Int. Cl.⁷ .................................................. G05B 23/02
(52) U.S. Cl. ....................................... 340/825.08; 705/27
(58) Field of Search ................................. 705/26, 27, 37, 705/8, 12; 340/875.08, 825.24, 825.33, 825.35, 825.06, 825.07

(56) References Cited

U.S. PATENT DOCUMENTS

| | | | |
|---|---|---|---|
| 5,394,324 | * | 2/1995 | Clearwater ............................... 705/20 |
| 5,765,138 | * | 6/1998 | Aycock et al. ............................ 705/7 |
| 5,873,069 | * | 2/1999 | Reuhl et al. ............................. 705/20 |
| 6,076,070 | * | 6/2000 | Stack ...................................... 705/20 |

* cited by examiner

*Primary Examiner*—Brian Zimmerman
(74) *Attorney, Agent, or Firm*—Robert B. Leonard

(57) ABSTRACT

A method of communicating between a plurality of devices in a controller area network is disclosed. The method includes a first device transmitting a first message over the network, a second device comparing a first value in the first message with a second value, and a third device responding to messages it receives over the network. The method may involve a number of producer devices and a consumer device. The consumer device responds to messages sent as instance zero. The method may involve a number of producer devices, an intermediate consumer and a consumer device. The producer devices send their messages as instances other than zero. The intermediate consumer receives the messages from the producer devices, compares them, and sends messages as instance zero to the consumer device. The producer devices may be thermostats, actuators, sensors, etc. The consumer device may be a furnace, an air conditioner, etc.

16 Claims, 5 Drawing Sheets

MULTIPLE VALUE MULTIPLE OWNER MESSAGE CLASS

FIELD OF THE INVENTION

This invention relates to methods for communicating in a control area network, and particularly to such methods in which a consumer of data transmitted on the network listens for a special instance of the data.

BACKGROUND OF THE INVENTION

In controlling various kinds of equipment in homes and buildings, the equipment is often connected to a network through which information is transmitted. Connecting the equipment together in a network system has the advantage that various parts of the system can "communicate" with each other, whereby the system works with maximum efficiency and potential inconsistencies, such as two parts of the system counteracting each other in operation, can be avoided.

A controller area network may, for example, be used for such purposes. Messages of variable length are transmitted in the network for controlling the system to operate according to provided algorithms. The message frame format includes an identifier at the beginning of each message which provides an identity for each message. The identity may, for example, relate to the kind of data transmitted in a data field of the message.

In a system including several similar producers of equivalent information, and including at least one ultimate consumer of the information produced by the producers, the system must facilitate that the consumer knows to which producers to listen. It is also important that the network is not overloaded with messages from those producers to which the consumer is not listening.

One way of arranging a system in accordance with the above would be to configure every producer particularly for its designated role in the system, and for the ultimate consumer to make use of addressing of the producers in the network. However, this method is undesirable in that it requires more initial programming and system configuration than is desirable for the typical home and building control system. Besides the additional work requirement, which may be inconvenient in a home or building environment, the costs of installation will likely increase with such a solution. Furthermore, the amount of information transmitted in the network may typically increase with this method, perhaps making the system harder to manage. An additional disadvantage is that producers cannot be added, and/or removed from the system without particular reconfiguration and/or readdressing of the producers.

SUMMARY OF THE INVENTION

A method of communication between at least one producer device and at least one consumer device in an environmental control network includes transmitting a message from the producer device on the network for receipt by the consumer device and other producing devices that may be present on the network, the message including at least a demand value monitoring the network at the producer device for any messages sent from other producer devices that may be present on the network, terminating further transmission of the message from the producer device if the producer device senses a message from another producer device with a greater demand value, and the consumer device responding to a demand value last received over the network and intended for receipt by the consumer device.

An embodiment of the method according to the invention involves a number of producer devices and a consumer device. A first producer device transmits a first message with a first value over the network. A second producer device compares the first value to a second value. If the second value is higher than the first value, the second producer device will transmit a second message over the network. The consumer device will respond to the last message it receives.

An environmental control network with a network bus includes at least one environmental condition sensing device connected to the network bus, wherein the sensing device including a transmitter for transmitting messages over the network including at least a demand value, means for monitoring the network bus at the sensing device for any messages sent from other sensing devices that may be present on the network, and means for terminating further transmission of the message from the producer device if the producer device senses a message from another producer device with a greater demand value, and at least one consumer device connected to the network bus, wherein the consumer device including means for responding to a demand value last received over the network bus.

These and various advantages and features of novelty which characterize the invention are pointed out with particularity in the claims annexed hereto and forming a part hereof. However, for a better understanding of the invention, its advantages, and the objects obtained by its use, reference should be used to the accompanying drawings and descriptive matter which form a further part hereof, and in which there is illustrated and described preferred embodiments of the invention.

BRIEF DESCRIPTION OF THE DRAWINGS

In the drawings wherein corresponding reference numerals generally indicate corresponding parts throughout the several views.

DETAILED DESCRIPTION OF THE DRAWINGS

The low end subsystem topology (LESST), developed by Honeywell Inc., is a topology used for a low cost communication system of microprocessor based HVAC controls for residential applications. Many different kinds of systems may operate under the LESST topology. Several types of nodes, including thermostats, actuators, and sensors may be physically linked together using, for example, a three wire connection scheme. The nodes use a variant of a controller area network protocol to transfer messages between each other.

As is well known, the ISO/OSI standard defines seven communication layers—the application, presentation, session, transport, network, link and physical layers. LESST uses three of the seven OSI communication layers—the application, data link and physical layers. The application layer of LESST includes rules for broadcasting data messages between nodes in a LESST system.

Messages in the LESST system include a name of the message, an instance of the data, and the value of the data. The instance field may, for example, be used to distinguish a message from another message having the same name and the same or different data value. An ultimate consumer of data in LESST system network may listen for a special instance of data, for example, instance zero.

The value of the data may be of many different kinds depending on the particular application. Exemplary values such as heating and cooling demands, and fan circulation requests may be used to indicate particular requests made by the devices. As further examples, values such as heat status, emergency heat status, and fan status may be used to indicate that a current value of the particular data is being transmitted.

In an LESST system where a plurality of producers transmit messages as instance zero, a function should be provided to avoid that any producers but one should be controlling a consumer of the messages with their data values. Which producer is chosen to transmit its message including its data to the consumer, is determined in consideration of the kind of data being transmitted, and also in consideration of the intended purposes of the LESST system. For example, it may be determined that the producer which has the highest data value should be the one transmitting its message to the consumer.

Figure 1:
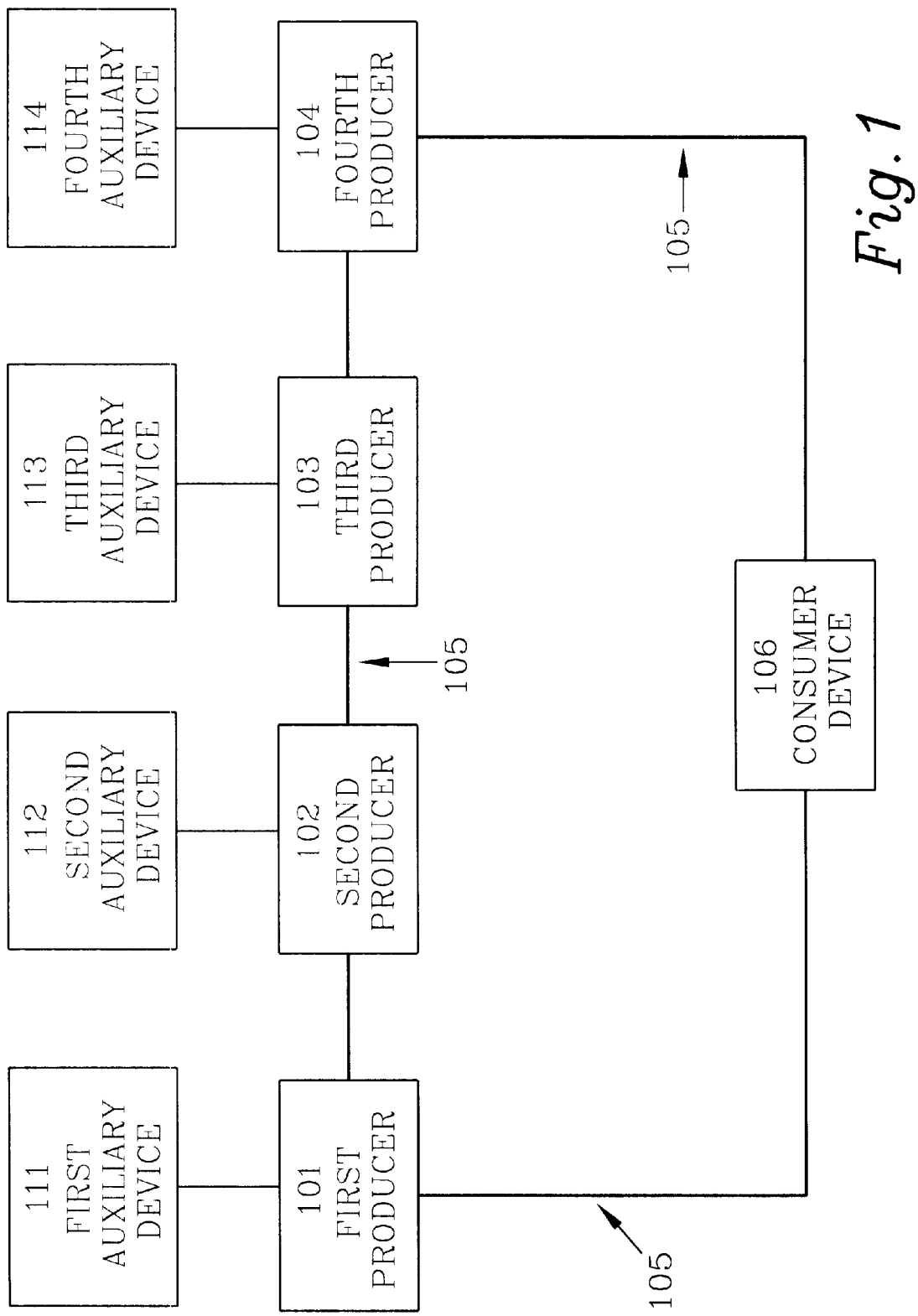
FIG. 1 is a first exemplary network in which embodiments of the method according to the invention may be used.

An exemplary network system in which an embodiment of the method according to the invention may be used is shown in FIG. 1. Four producers 101–104 are connected to a consumer device 106 through the bus 105. The producers 101–104 can transmit messages over the bus 105 to communicate with each other and with the consumer device 106.

Several different devices may be used as the producers 101–104. The producers may all be equivalent devices, or they may include different devices. For example, one or more of the producers 101–104 may be a thermostat, humidistat, an actuator or a sensor. Several different devices may be used as the consumer device 106 in embodiments of the invention. The consumer device 106 "consumes" the data values produced by the producers 101–104. For example, the consumer device 106 may be a furnace which uses the values produced by the producers to control its operation. For example, if the first producer 101 is a thermostat, the furnace may receive a value from the thermostat indicating a heating demand in a zone in which the thermostat is located. It should be noted that fewer or more producers than shown in FIG. 1 may be used with embodiments of the invention, and similarly, more consumer devices may be used.

The producers 101–104 transmit their messages as instance zero in this embodiment of the method. The consumer device 106 responds to messages sent as instance zero. At start up of the system, the one of the producers 101–104 that is ready will transmit a message over the bus 105. In practical situations, this may be any one of the four producers, but for purposes of clarity it will be assumed in this description that the first producer 101 is the first one to transmit its message. The other producers 102–104 receives the message transmitted by producer 101, and compare a first value from the first message with their respective present values. If one or more of the producers 102–104 finds that its own value is less than the value transmitted in the message from the first producer 101, it will not transmit a message of its own and remain listening in the system. If one or more of the producers 102–104 finds that its own value is higher than the value in the message transmitted from the first producer 101, that producer will transmit a message of its own including its own value. This procedure may be repeated one or more times after start up of the system, depending on the present values at the producers 101–104, and depending on in which order the producers are booted and start carrying out their algorithms. From the foregoing description, it is clear that after the producer which currently holds the highest value in the system has transmitted a message with its value, the other producers will remain quiet after receiving this message.

The one of the producers 101–104 which has the highest value of the data, and which accordingly transmitted the last message received by the consumer device 106, is said to own that data.

The consumer device 106 responds to the last message received. In accordance with the above, when the producer which currently has the highest value of the data has transmitted its value across the system, the consumer device 106 will respond to the message including this value and carry out its function accordingly. As noted above, the consumer device 106 may, for example, be a furnace in a building, and when the furnace has received the message including the highest heating demand at a particular time, the furnace will control its operating parameters to meet the demand corresponding to the highest present heating demand.

The one of the producers 101–104 which transmitted the message which was the last one received by the consumer device 106, will periodically send a message over the network including its current data value. This value may be the same value as transmitted earlier, or it may have changed since the earlier transmission. As long as no one of the other producers has a value greater than the one being transmitted periodically, they will not transmit their values and remain listening in the system. If one of more of the other producers find that its present value is higher than the value of the last message it received, it will transmit a message with its own value over the system. The period between regularly transmitted messages may be selected in consideration of the particular application in which the method is being used. For example, a period of 1–5 minutes may be used in some applications.

If one of the producers 101–104 has not received any message for a period of time, it will become the owner and transmit a message with its data value over the network. The period of time before this is done may be selected in consideration of the particular application in which the method is being used, and/or in consideration of the periodicity of regularly transmitted messages as described just above.

Auxiliary devices 111–114 may be connected to the system. The devices may each be connected to a particular producer as shown in FIG. 1. In other embodiments, the auxiliary devices 111–114 may be connected to the system through the bus 105. Several different devices may be used as the auxiliary devices 111–114. For example, the auxiliary device 111 may be one or more register dampers mounted in the ventilation ducts leading to a zone where the first producer 101 is located.

The producer which currently owns the data controls its corresponding auxiliary device accordingly. For example, if the first producer 101 is a thermostat in a zone where the first auxiliary device 111 is one or more register dampers, and if the first producer 101 owns the heating demand data, the register dampers may be controlled to an open position as long as the first producer 101 owns the heating demand data.

The other producers which do not own the heating demand data, will control their auxiliary devices accordingly. For example, if the second producer 102 is a thermostat which does not presently have the highest heating demand in the system, its auxiliary device 112, such as a register damper may be controlled corresponding to the lesser heating demand of the second producer 102. This may, for example, include closing the register damper fully or partially for at least a portion of a heating cycle during which heat is provided.

Figure 2:
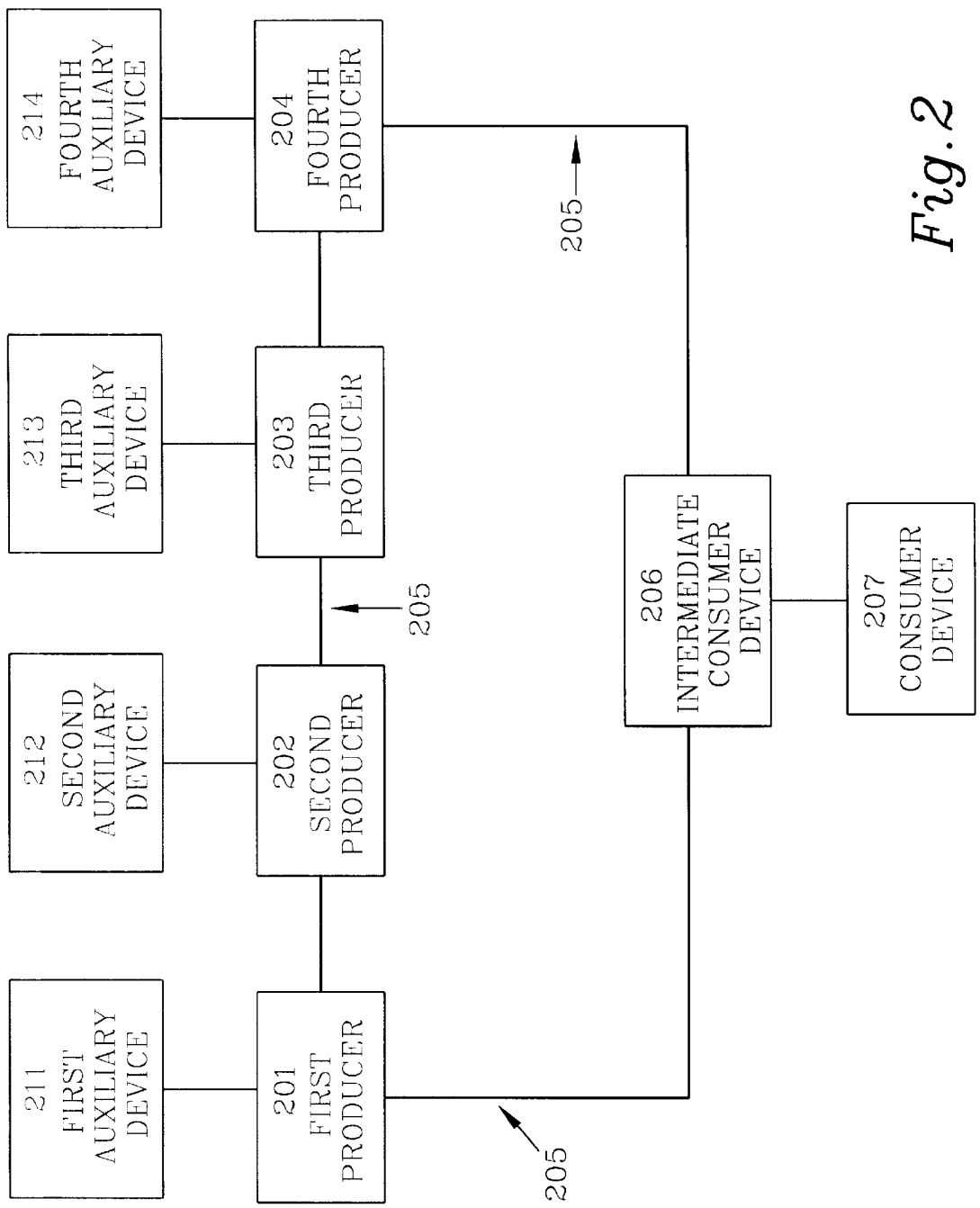
FIG. 2 is a second exemplary network in which embodiments of the method according to the invention may be used.

A second exemplary system in which an embodiment of the method according to the invention may be used is shown in FIG. 2. The system includes producers 201–204 connected to an intermediate consumer device 206 through a bus 205. A consumer device 207 is connected to the intermediate consumer device 206 by the bus 205. The producers 201–204 produce values and transmit them in messages, which values are used by the consumer device 207 to control its operating parameters.

More than one type of message may be transmitted in the system. For example, messages including data values regarding heating demand as well as messages including data values regarding cooling demand may be transmitted in the system. Accordingly, the consumer device 207 which consumes the data values of the different messages, may comprise heating and cooling equipment configured to meet the demands of, and perform the desired finction in, the particular system in which the embodiment of the invention is used.

The producers 201–204 transmit their messages at instances other than zero. The consumer device 207 responds to messages sent as instance zero, and thus does not respond directly to any messages sent by the producers 201–204. The intermediate consumer device 206 receives all messages sent by the producers, and compares the respective data values of messages that have the same identifier. For example, all data values with respect to heating demand are compared only to other data values with respect to heating demand. Similarly, data values with respect to cooling demand are compared only to other data values with respect to cooling demand. The intermediate consumer device 206 transmits messages as instance zero to the consumer device 207. For example, if the intermediate consumer device 206 has received messages containing data values with regard both to heating demand and cooling demand, it will send one message as instance zero regarding heating demand and one message as instance zero regarding cooling demand.

Furthermore, the intermediate consumer device 206 may, for example, control a zone in which the first producer 201 and the first auxiliary device 211 are located. For example; if the first producer 201 owns a heating demand value, the first auxiliary device 211, which for example may be a register damper, will be controlled to an open position. Similarly, if the first producer 201 does not own the heating demand value, the register damper will be controlled to close fully or partly during at least a portion of a heating cycle during which heat is provided.

A further embodiment of the method according to the invention will now be described with reference to FIG. 2. In this embodiment, the method makes use of a value regarding the relative humidity in the building where the system is being used. The fourth producer 204, for example, may be a humidity sensor which transmits messages including a data value for the relative humidity. At least two of the other producers 201–203 are thermostats, transmitting messages including data values regarding cooling demands. The producers transmit their messages as instances other than zero. The fourth producer 204 transmits its messages as instance zero. The intermediate consumer device 206 receives the messages.

The intermediate consumer device 206 transmits cooling demand messages as instance zero which are received by the consumer device 207. In this embodiment, the consumer device 207 may, for example, be a cooling equipment such as an air conditioner. The intermediate consumer device 206 compares the received data values regarding cooling demand. In determining the data value regarding cooling demand which should be sent as instance zero to the consumer device 207, the intermediate consumer device 206 takes into consideration the relative humidity as provided in the message from the fourth producer 204.

Taking the relative humidity into consideration may be advantageous, for example, in the following way. Generally speaking, the perceived level of comfort with respect to the climate inside a home or other building does not depend solely on temperature but also, among other factors, on relative humidity. When the temperature in a zone of a building is such as to warrant the operation of cooling equipment, a cooling demand will be transmitted in the system. If the relative humidity is high, the extra cooling provided in response to the cooling demand may not feel satisfactory to persons in the zone. The method avoids the problem outlined above by taking the relative humidity into consideration when determining which zone should own the cooling demand value. When the relative humidity is at a level where it can be expected that regular cooling efforts are not entirely satisfactory, the system may, for example, control the cooling equipment to work at a higher level or modify the on/off time of a fan distributing air throughout the building.

Figure 3:
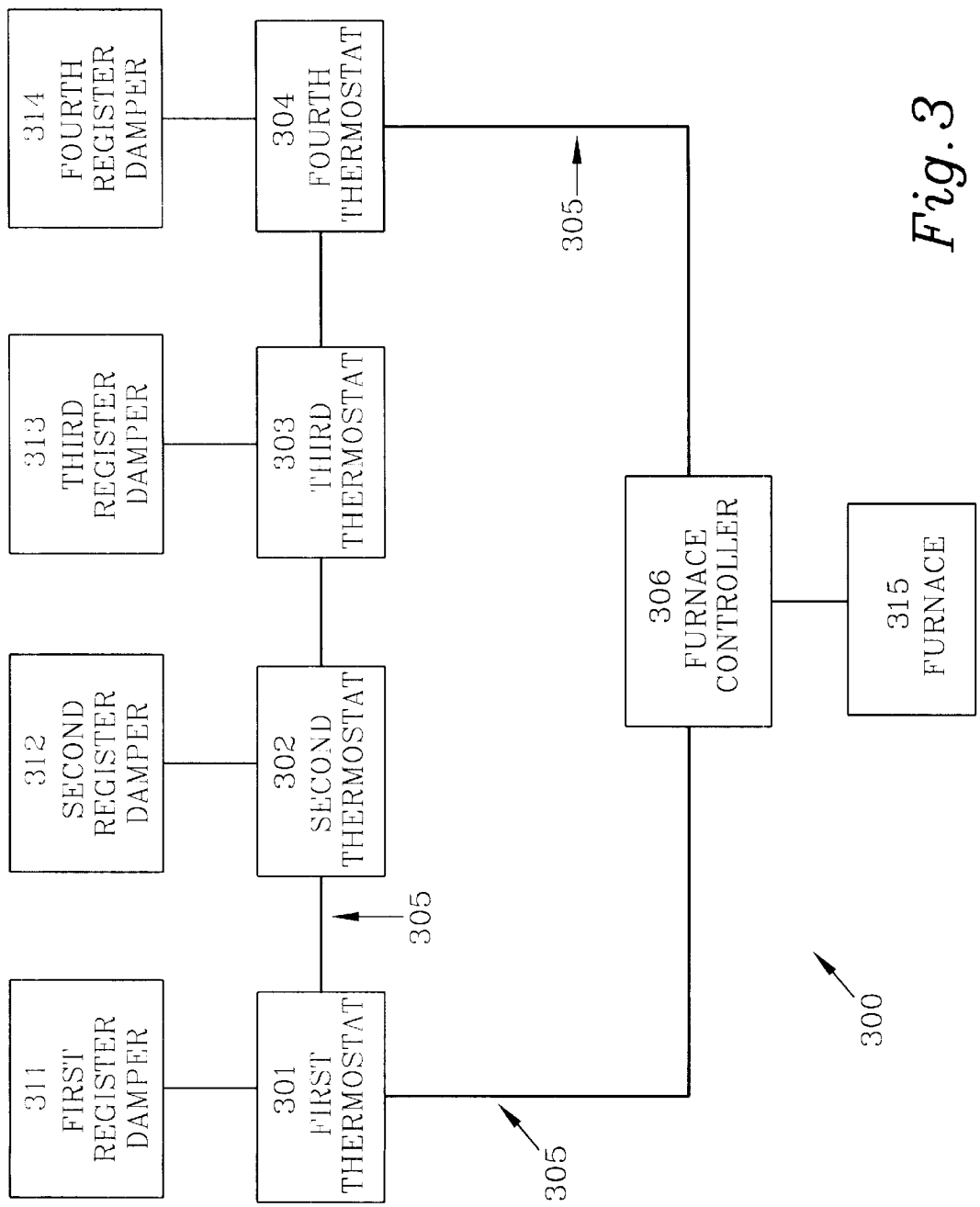
FIG. 3 is an embodiment of an environmental control network.

An embodiment of an environmental control network 300 according to the invention is shown in FIG. 3. The network 300 may for example be provided in a home or other building for providing indoor environmental control.

The network 300 is shown having four thermostats 301–304. It is noted that fewer or more thermostats may be used with other embodiments. The thermostats include logic for conducting their function in the network satisfactorily and are connected by the bus 305. The thermostats 301–304 are used for sensing the temperature at their location, and transmitting and receiving messages over the bus 305.

A furnace controller 306 is connected to the network 300 by the bus 305. The furnace controller is used for transmitting and receiving messages over the bus, and for controlling the operation of a furnace 315. In the shown embodiment, the furnace 315 is shown hard-wired to the furnace controller 306, but other well-known forms of communication may be used as well. It is noted that well-known heating devices other than a furnace may be used with other embodiments of the invention, and that cooling or ventilation equipment may be used together with, or instead of, the furnace 315.

In the network 300, it is desired that one of the thermostats 301–304 which has the largest heating demand will control the furnace 315 through the furnace controller 306. The thermostats 301–304 produce heating demands and transmit them as messages which are received by the furnace controller 306. In the following description of the embodiment, it will be assumed that the first thermostat 301 had the greatest heating demand of the thermostats. If one or more of the thermostats 302–304 sends its message with its heating demand, the first thermostat 301 will receive the message and compare the received heating demand with its own heating demand. In this example, the first thermostat 301 will find that its heating demand is greater than the heating demand received, and will consequently transmit a message with its heating demand over the bus 305. Those thermostats which also received the message which prompted the first thermostat 301 to send its message may also have transmitted messages in response to that initial message. However, when the message from the first thermostat 301 arrives, each of the thermostats 302–304 will find that the heating demand from the first thermostat 301 is the greatest, and will consequently terminate further transmission of their messages.

The furnace controller 306 will receive all messages sent by the thermostat 301–304. The furnace controller 306 will only respond to a heating demand in the last message it receives over the bus 305. In accordance with the above, after the message from the first thermostat 301 with the greatest heating demand has been transmitted over the bus 305, the other thermostats 302–304 will not transmit their messages. Thus, the message from thermostat 301 will be the last message transmitted over the bus 305 and received by the furnace controller 306, which will respond to the message by controlling the furnace 315 to operate in accordance with the heating demand of the first thermostat 301.

The thermostat with the greatest heating demand, in this example the first thermostat 301, will periodically transmit its message with its heating demand over the network. If any of the other thermostats 302–304 find that their heating demand is greater than the last transmitted heating demand from the first thermostat 301, they will transmit a message with their higher heating demand. If one of the thermostats 302–304 has not received a message from the first thermostat 301 for a period of time, that thermostat will transmit a message over the bus 305 with its heating demand. For example, if no one of the thermostats 301–304 receives any message over the bus 305 during a time period, they will all attempt to send their messages. However, as discussed above, a thermostat will not send its message if it receives a message having a greater heating demand than its own heating demand.

When the furnace controller 306 has controlled the furnace 315 to operate in accordance with the greatest heating demand, register dampers connected to the thermostats will be controlled accordingly. For example, if the first thermostat 301 had the greatest heating demand, its register damper 311 will be controlled to an open position during a heating cycle of the furnace 315. In this example, the second thermostat 302 has a lesser heating demand than the first thermostat 301, and its register damper 312 will be controlled to dampen the supply of heat to the location where the second thermostat 302 is located. The register dampers 313 and 314 of the third and fourth thermostats 303 and 304, respectively, will be controlled in a similar way, such that an amount of heat corresponding to the heating demands of the thermostats 303 and 304 is delivered.

Figure 4:
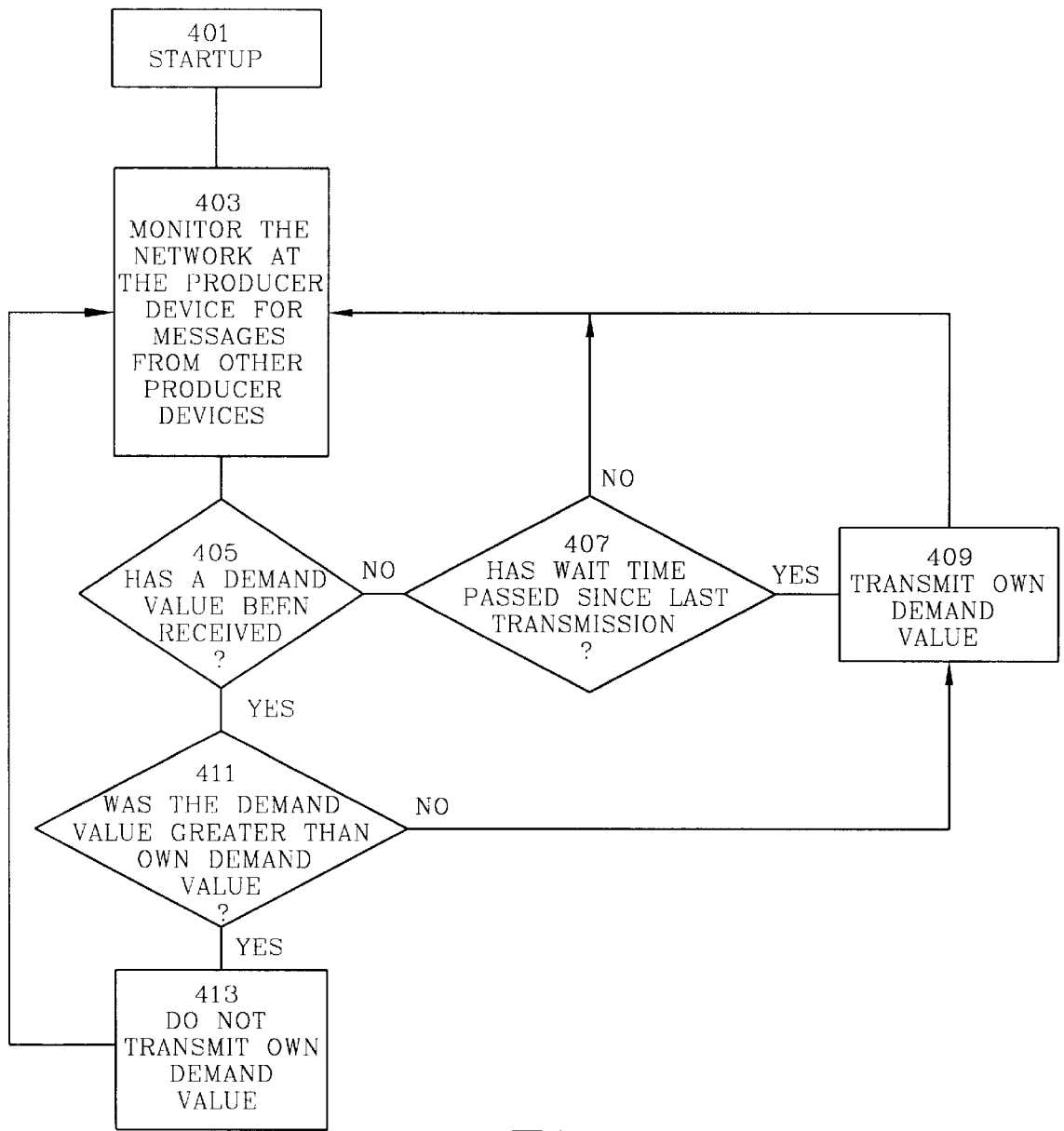
FIG. 4 is an exemplary flowchart showing an embodiment of the method according to the invention.

A flow chart of one embodiment of a method according to the principles of the invention is shown in FIG. 4. The start-up of the system is indicated as step 401. In step 403, the network at a producer device is monitored for messages from other producer devices. In step 405, it is determined whether the producer device has received a demand value. If no, the method continues to step 407, where it is determined whether the time period Wait Time has passed since the device last transmitted a message. The parameter Wait Time may be set depending on the particular characteristics of the system in which the method is being used. For example, the Wait Time may provide a periodic interval between transmission of messages from a device which has the highest demand value for a number of cycles. If the answer is no, the method returns to step 403. If the system has just been started up, or if otherwise the Wait Time has not yet passed, the question will be answered with a yes, and the method continues to step 409. In step 409, the producer device transmits its own demand value, and then returns to step 403.

If a demand value has been received in step 405, the method continues to step 411, where it is determined whether the received demand value is greater than the producer device's own demand value. If it is not, the method continues to step 409 where the device transmits its value. If the received value is greater than the device's own value, the method continues to step 413, where it is indicated that the device does not transmit its own demand value. The method then returns to step 403.

Figure 5:
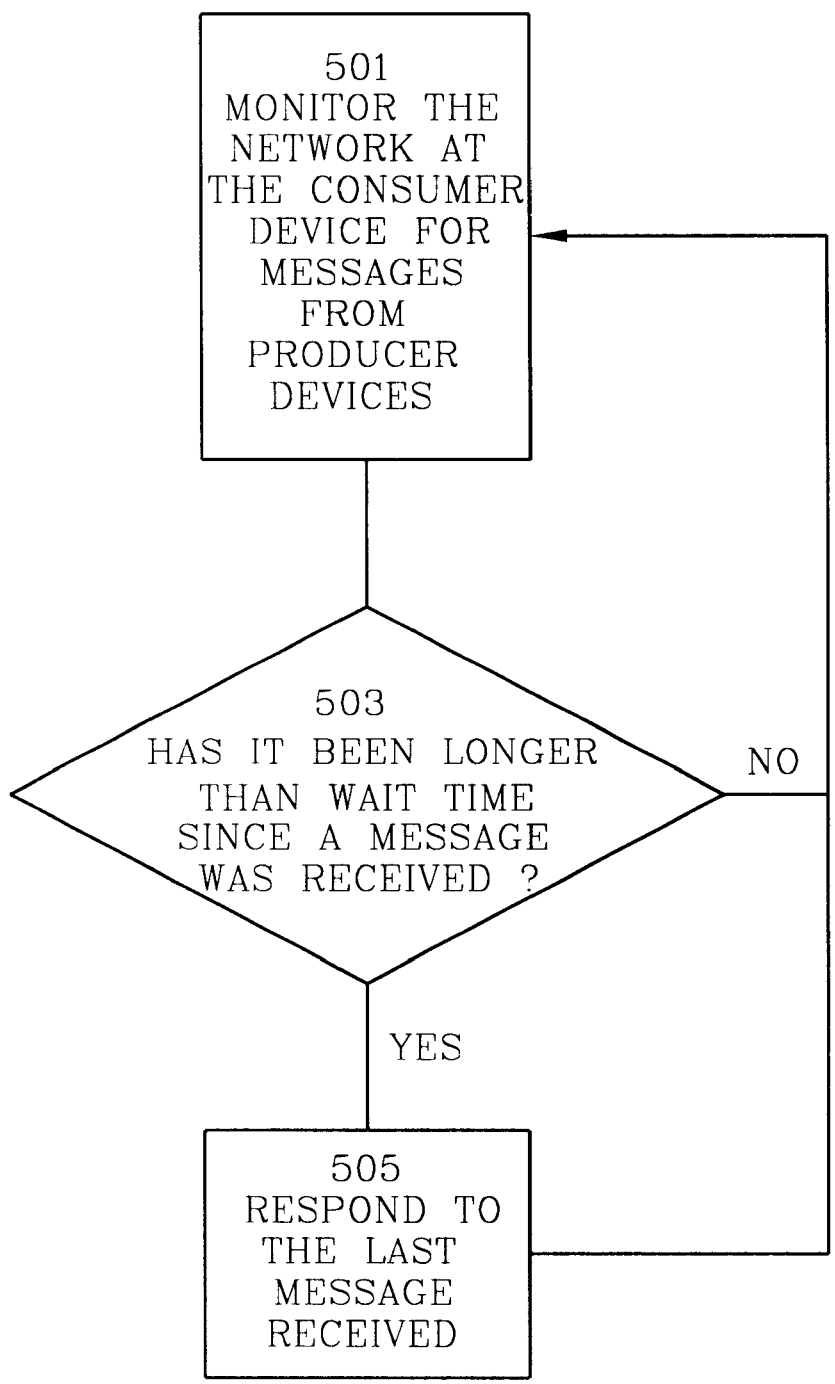
FIG. 5 is an exemplary flowchart showing method steps with respect to a consumer device in a system.

An exemplary embodiment of the steps taken with respect to a consumer device in a system with at least one produce device is shown in FIG. 5. In step 501, the network is monitored at the consumer device for messages from producer devices. In step 503, it is determined whether it has been longer than Wait Time since a message was received. If no, the method returns to step 501. If the Wait Time has passed, the method continues to step 505, where the consumer device responds to the last message received. In combination for example with the exemplary method for the producer devices shown in FIG. 4, the method in FIG. 5 may allow the producer devices to exchange their messages such that it is determined whose demand value is the greatest. After the greatest demand value has been transmitted in the system, the consumer device waits during Wait Time to determine if it actually was the last message, and then responds accordingly.

In using embodiments of the invention devices may be connected in a LESST network without configuration of zone instance at each device. When the devices in the network use instances other than zero, embodiments of the invention allow enhanced control of the transmitted data values by an algorithm in an intermediate consumer device.

It is to be understood, that even though numerous characteristics and advantages of the invention have been set forth in the foregoing description, together with details of the structure and function of the invention, the disclosure is illustrative only, and changes may be made in detail, especially in matters of shape, size and arrangement of the parts within the principals of the invention to the full extent indicated by the broad general meaning of the terms in which the appended claims are expressed.

I claim:

1. A method of communication between at least one producer device and at least one consumer device in an environmental control network, comprising the steps of:

transmitting a message from the producer device on the network for receipt by the consumer device and other producing devices that may be present on the network, the message including at least a demand value;

monitoring the network at the producer device for any messages sent from other producer devices that may be present on the network;

terminating further transmission of the message from the producer device if the producer device senses a message from another producer device with a greater demand value; and the consumer device responding to a demand value last received over the network and intended for receipt by the consumer device.

2. The method in accordance with claim 1, further including the step of monitoring at the producer device the time interval from transmission of the last message on the network for receipt by the consumer device, and initiating transmission of messages from the producer device to the consumer device when the time interval exceeds a predetermined value.

3. The method in accordance with claim 1, wherein the step of transmitting the message further includes transmitting a demand type value identifying the type of demand.

4. The method in accordance with claim 1, wherein the step of transmitting the message further includes transmitting an instance value indicating whether the message is for receipt by the consumer device.

5. The method in accordance with claim 1, further including the step of comparing the demand value to an initial value prior to transmitting the message from the producer device.

6. The method in accordance with claim 1, further including the step of the producer device not receiving any message during a first time period prior to transmitting the message.

7. The method in accordance with claim 1, wherein the step of the consumer device responding includes the consumer device controlling its operation parameters in accordance with the last demand value it received.

8. An environmental control network with a network bus, the network comprising:

at least one environmental condition sensing device connected to the network bus, the sensing device including:
   a transmitter for transmitting messages over the network including at least a demand value;
   means for monitoring the network bus at the sensing device for any messages sent from other sensing devices that may be present on the network; and
   means for terminating further transmission of the message from the producer device if the producer device senses a message from another producer device with a greater demand value;
at least one consumer device connected to the network bus, the consumer device including means for responding to a demand value last received over the network bus.

9. The network in accordance with claim 8, wherein at least one environmental condition sensing device includes a thermostat.

10. The network in accordance with claim 8, wherein the consumer device includes a furnace.

11. A method of communication between at least one producer device and at least one consumer device in an environmental control network, comprising the steps of:

transmitting a message from the producer device on the network for receipt by the consuming device and other producing devices that may be present on the network, the message including at least a demand value;

monitoring the network at the producer device for any messages sent from other producer devices that may be present on the network;

terminating further transmission of the message from the producer device if the producer devices senses a message from another producer device with a greater demand value;

monitoring at the producer device the time interval from transmission of the last message on the network for receipt by the consumer device, and initiating transmission of messages from the producer device to the consumer device when the time interval exceeds a predetermined value; and the consumer device responding to a demand value last received over the network and intended for receipt by the consumer device.

12. The method in accordance with claim 11, wherein the step of transmitting the message further includes transmitting a demand type value identifying the type of demand.

13. The method in accordance with claim 11, wherein the step of transmitting the message further includes transmitting an instance value indicating whether the message is for receipt by the consumer device.

14. The method in accordance with claim 11, further including the step of comparing the demand value to an initial value prior to transmitting the message from the producer device.

15. The method in accordance with claim 11, further including the step of the producer device not receiving any message during a first time period prior to transmitting the message.

16. The method in accordance with claim 11, wherein the step of the consumer device responding includes the consumer device controlling its operational parameters in accordance with the last demand value it received.

* * * * *